May 12, 1959  S. A. MYERS  2,886,009

ELECTRO-HYDRAULIC SERVO ASSEMBLY WITH FAIL-SAFE STRUCTURE

Filed Nov. 29, 1955

INVENTOR:
Samuel A. Myers
By Herbert E. Metcalf
His Patent Attorney

United States Patent Office 2,886,009
Patented May 12, 1959

2,886,009

ELECTRO-HYDRAULIC SERVO ASSEMBLY WITH FAIL-SAFE STRUCTURE

Samuel A. Myers, Los Angeles, Calif., assignor to Northrop Aircraft, Inc., Hawthorne, Calif., a corporation of California Application November 29, 1955, Serial No. 549,609

4 Claims. (Cl. 121—41)

This invention relates generally to servo mechanisms and more particularly to electro-hydraulic servo mechanisms functioning to establish a predetermined relationship between certain component parts thereof in the event initial command signals fail to reach the system.

Conventional electro-hydraulic servos are susceptible to various types of failures. Two of the most frequent and objectional types occurring in a servo system constitute "hard-over" and "loss" of signal failures in which the servo's output member moves to an extreme end of its travel or performs in an erratic manner, respectively. The above failures are particularly objectional at such times as a servo system is utilized to position the control surfaces of an aircraft or the like.

Briefly the present invention discloses a servo device incorporating a secondary closed loop originating secondary feedback signals which, in the event of failure of initial command signals to reach the servo mechanism, becomes effective to position the servo's output member in a relative predetermined position with respect to structure housing the output member. The initial command signals are of such a magnitude that they dominate or override the secondary feedback signals at such times as both sets are concurrently transmitted to the servo mechanism.

Accordingly it is an object of the present invention to provide a servo mechanism incorporating a "fail-safe" feature.

Another object is to provide a servo mechanism in which the output member thereof is positioned in a predetermined relationship with respect to structure housing the output member in the event initial command signals fail to reach the mechanism.

Another object is to provide a servo mechanism the component parts of which do not require adjustment or manipulation during the operation of the mechanism and are light in weight and simple in design and construction.

The characteristic features of the present invention are pointed out in the appended claims, however, the invention itself and a preferred mode of carrying it out will be better understood by referring to the following description taken in connection with the accompanying drawings forming a part of this application and in which:

Figure 1:
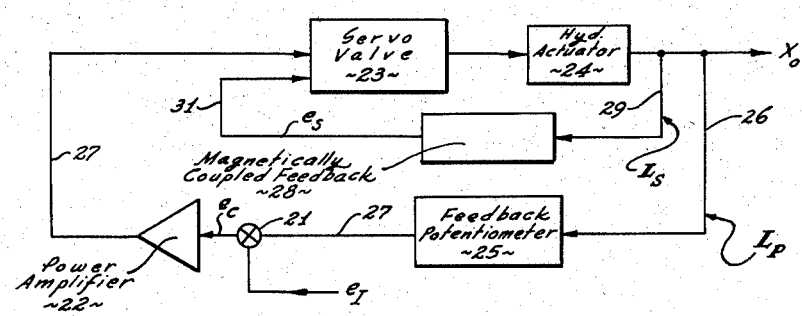
Figure 1 is a block diagram illustrative of an electro-hydraulic servo system as disclosed herein.

Referring now to the drawing, a better understanding of the invention will be forthcoming from an explanation of the block diagram of Figure 1. In this figure a servo system comprising a differential 21, power amplifier 22, electric servo valve 23, hydraulic actuator 24, and feedback potentiometer 25 are combined in a conventional closed loop circuit in a manner that is well known in the art. Connecting and signal motion transmitting means 26 and 27 extend between the output member $X_0$ of the actuator 24, and the potentiometer 25 and between the latter and the differential 21, respectively. Elements 21 to 25, inclusive, and connectors 26 and 27 are hereinafter referred to as the system's primary closed loop $Lp$.

Initial command signals $e_I$, originating at a location outside the loop $Lp$, are transmitted to the differential 21. Here they are combined with primary feedback or correction signals $e_f$, received from the primary loop $Lp$, to provide error signals $e_c$ which are transmitted to the amplifier 22. The various members comprising the primary loop together with their functions, are well known in the art and, therefore, a further discussion in this respect is deemed unnecessary.

Also shown in Figure 1 is a magnetic feedback member 28 coupled to the output member $X_0$ by a member 29 and from which secondary feedback signals $e_s$ are transmitted to the valve 23 through a medium 31. Elements 23, 24, and 28, and members 29 and 31 are hereinafter referred to as the system's secondary closed loop $Ls$. The secondary loop $Ls$ constitutes a "fail-safe" feature for the servo system and functions in a manner that will become apparent as the disclosure progresses.

During normal functioning of the servo system, error signals $e_c$ function to control movements of the output member $X_0$. At this time secondary feedback signals $e_s$, originating in the secondary loop $Ls$, are also acting on the valve 23. The secondary feedback signals, however, are of such a magnitude or power level that they are overruled by the error signals $e_c$ and, therefore, are ineffective to control movements of the output member $X_0$. If, however, the initial command signals $e_I$ and feedback signals $e_f$, or in other words the error signals $e_c$, are interrupted and fail to reach the amplifier 22 the secondary loop $Ls$ becomes effective and functions to position the output member $X_0$ in a predetermined position relative to the actuator 24.

Figure 2:
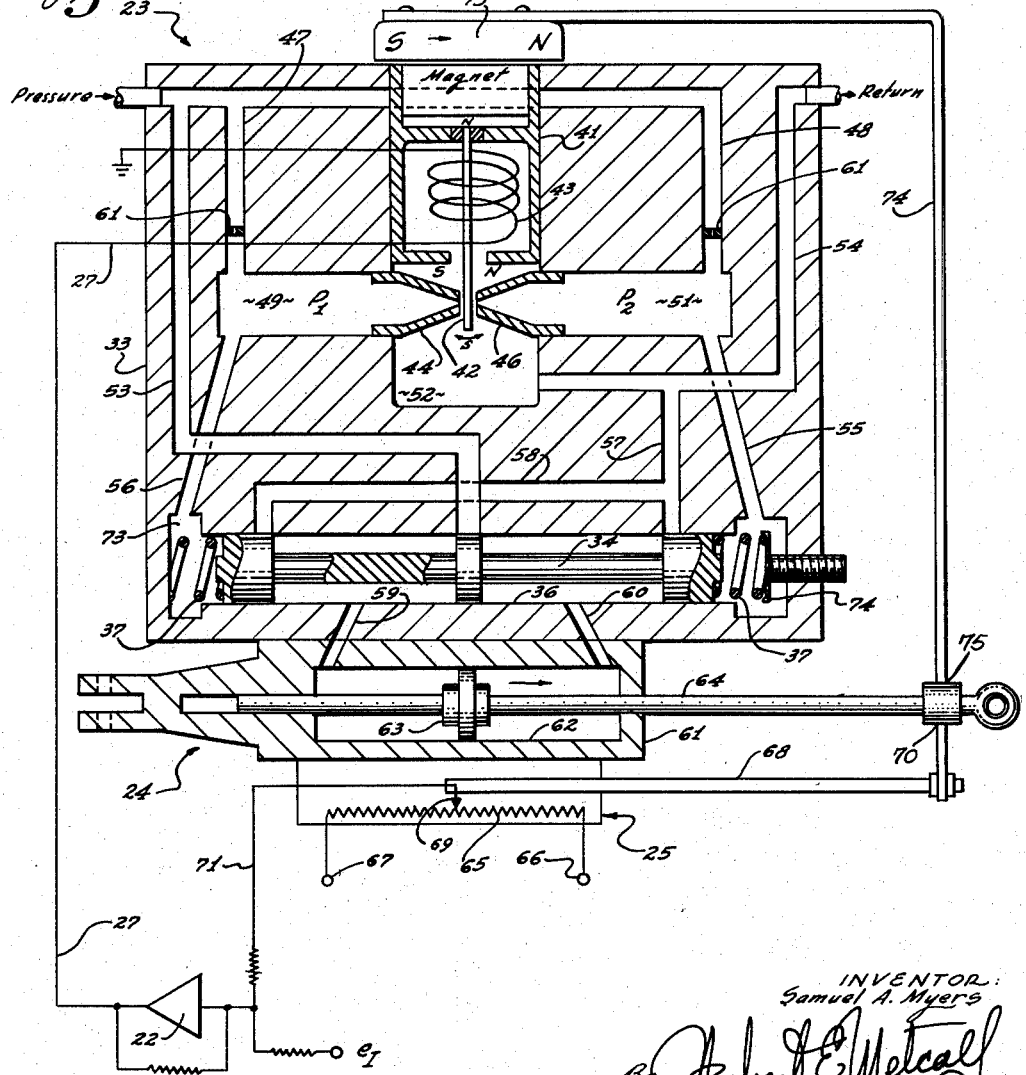
Figure 2 is a detailed schematic sectional view of an electro-hydraulic servo mechanism of the type disclosed herein and which may be utilized in the servo system of Figure 1.

One type of apparatus incorporating the fail-safe feature disclosed herein, that is the component parts comprising the secondary loop $Ls$ of Figure 1, is shown in Figure 2. In this figure the valve 23 is shown as constituting a conventional electro-hydraulic transfer valve 23. Due to the conventional nature of the valve 23, actuator 24, and potentiometer 25, these elements will not be described in detail, however, their components will be identified together with a brief description of their operation.

The valve 23 consists of a housing 33 in which a spool type valve element 34 is operationally mounted in a bore 36. The valve element is normally held in a neutral position by centering springs 37. Also mounted in the housing 33 is a permanent magnet 41, an elongated resilient valve member 42, and an induction coil 43. Nozzle members 44 and 46 are spaced equal distances on each side of the valve element 42. Inlet passageways 47 and 48, opposed bores 49 and 51, exhaust chamber 52, and passageways 53 to 60, inclusive, provide means for the passage of fluid through the housing 33. Identical restrictor elements 61 are located in each of the inlet passages 47 and 48.

The actuator 24 is of the piston type consisting of a housing 61 having a chamber 62 formed therein and in which a piston 63 and rod 64 are operationally mounted.

The potentiometer 25 includes a resistor element 65 the end leads 66 and 67 of which may be connected to the poles of a D.C. voltage source (not shown). The arm 68 is fixedly secured to the output member of the actuator 24, as indicated by the numeral 70, and functions to displace the potentiometer's contact member 69 in direct proportion to movements of the output member 64. The lead 71, corresponding to the connector 27 in Figure 1, transmits feedback signals $e_f$ to the power amplifier 22.

The servo described thus far constitutes typical apparatus and briefly operates as follows. Initial command signals $e_I$ are transmitted to the coil 43, by means of the amplifier 22 and the lead 27, and act to energize the coil 43 which in turn acts to polarize the valve element 42 which is then deflected by the permanent magnet 41. Accordingly unequal fluid pressures are temporarily created in the chambers 73 and 74, located at respective ends of the valve spool 34, and pressurized fluid is directed to the chamber 62 to move the piston rod 64 in a desired direction. As the rod 64 moves the contact 69 is also moved originating feedback signals $e_f$ which are transmitted to the amplifier 22. As the rod 64 reaches its new desired position the feedback signals $e_f$ cancel out the initial command signals $e_I$. At this time the valve spool 34 has returned to its neutral position, as shown in Figure 2, and the new position of the rod 64 is stabilized.

The servo device of Figure 2, in addition to the previously described components, also includes the aforementioned fail-safe feature. Structurally this feature comprises a bar type permanent magnet 73 mounted normal to the resilient valve member 42 when each is considered in a lengthwise sense. The magnet 73 is fixedly secured to one end of an arm 74 the other end of which is fixedly secured to the rod 64 as indicated by the numeral 75. The magnet 73, located in close proximity to and directly above the member 42, acts to polarize the member 42 as the magnet is subjected to translatory movement imparted thereto by the rod 64.

For purposes of illustration it may be assumed that at such times as the piston 63 is in a neutral position, that is in the position as shown in Figure 2, the magnet is also in a neutral or centered position with respect to the valve element 42. In the magnet's neutral position its ends are equally spaced on opposite sides of the element 42. Under these conditions, and assuming that no command signals $e_I$, feedback signals $e_f$ and, therefore, no correction signals $e_c$ are reaching the coil 43, the resilient characteristics of the valve element 42 act to maintain the lower end thereof midway between the opposing ends of the nozzles 44 and 46. As the magnet is moved either to the right or left the element 42 will be polarized by the magnet's magnetic field. Accordingly the element 42 will be urged either to the right or left by the magnet 41, as the case may be, and thereby alter fluid flow through the nozzles 44 and 46 in the same manner as though the valve element was polarized by the induction coil 43. The polarization of the element 42, due to movement of the magnet 73 either to the right or left of its neutral or centered position, is in the opposite sense to polarization induced therein by current flowing through the coil 43. In other words, if current in the coil 43 results in polarizing the element 42 to provide a north pole at the upper end thereof then the magnet 73 will function to provide a south pole at the upper end of the valve element 42, although the latter polarization induced by the magnet will be dominated by the coil 43 as long as it is effective.

Assume now that initial command signals $e_I$, feedback signals $e_f$ and, therefore, the correction signals $e_c$ are at least temporarily interrupted and the piston 63 and rod 64 begin to drift to the right as viewed in Figure 2. Simultaneously the magnet 73 will be translated to the right thereby polarizing the valve element so that north and south poles are induced at the upper and lower ends thereof, respectively. Accordingly, simultaneously the valve element 42 will be urged toward nozzle 46 and the fluid pressure in bore 51, passageway 55, and chamber 74 will become greater than fluid pressure in bore 49, passageway 56, and chamber 73. Valve spool 34 will be moved to the left allowing pressurized fluid to enter the right hand end of chamber 62 via the passageways 53 and 60. It will now be apparent that the piston 63 and rod 64 will be returned to the left until they reach their centered position. At this time the magnet 73 will also be returned to its neutral position, fluid pressure equalized in bores 49 and 51, passageways 55 and 56, and chambers 73 and 74. The valve spool 34 will be returned to its neutral position by the centering springs 37 and the fluid pressure equalized on each side of the piston 63.

The advantages of the fail-safe features are readily apparent especially if the actuator 24 is utilized to position the control surfaces of an aircraft or guided missile. Under these conditions the attached control surfaces will assume a neutral position rather than a "hard-over" position or allowed to drift. The neutral position of the output member is considered the most desirable in the event of servo failure, however, any other position may be utilized by altering the relationship of the magnet 73 and piston 63. The piston 63 and rod 64 are retained in their neutral positions until the failure is corrected or until error signals $e_c$ are again received by the valve coil 43.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. The combination in a closed loop servo system which includes valve, actuator and potentiometer assemblies secured together in fixed relation, the valve assembly includes a valve element which is polarizable in response to current flow through a coil surrounding said valve member and when polarized is deflected by a magnetic field to effect fluid flow to said actuator, said actuator assembly includes a linear translating output member and the potentiometer assembly originates feedback signals which are transmitted to said coil in accordance with the instantaneous position of said output member, of a bar type permanent magnet polarized to provide opposite poles at the ends thereof, said permanent magnet being mounted adjacent said valve element for linear translational movement and functions to effect the polarization of said valve element in the opposite sense to polarization imparted thereto by said feedback signals.

2. Apparatus as set forth in claim 1: further characterized by including motion transmitting means one portion of which is fixedly secured to said output member and another portion thereof mounts said permanent magnet adjacent said valve element whereby said output member imparts said linear translating movement to said permanent magnet.

3. Apparatus as set forth in claim 2: further characterized in that said valve member and permanent magnet have respective longitudinal axes and the axis of said permanent magnet, as the latter is mounted on and moved by said motion transmitting means, has a normal relation relative to the axes of said valve element and both axes lie in a common plane.

4. Apparatus as set forth in claim 3: further characterized in that said output member has a predetermined position in said actuator assembly and at such time as said output member is in the latter position the poles of said permanent magnet are positioned equal distances on opposite sides of said valve element.

References Cited in the file of this patent

UNITED STATES PATENTS 2,722,198    Macgeorge    Nov. 1, 1955

FOREIGN PATENTS 986,906    France    Apr. 11, 1951